United States Patent [19]

Eichweber

[11] Patent Number: 4,868,567
[45] Date of Patent: Sep. 19, 1989

[54] LANDING APPROACH AID FOR AIRCRAFT

[75] Inventor: Kurt Eichweber, Hamburg, Fed. Rep. of Germany

[73] Assignee: Precitronic Gesellschaft fur Feinmechanik und Electronic GmbH, Hamburg, Fed. Rep. of Germany

[21] Appl. No.: 88,165

[22] Filed: Aug. 21, 1987

[30] Foreign Application Priority Data

Sep. 3, 1986 [DE] Fed. Rep. of Germany ....... 3629911

[51] Int. Cl.⁴ ............................................. G08G 5/00
[52] U.S. Cl. ................................ 340/953; 244/114 R; 340/947; 358/103
[58] Field of Search ............... 340/947, 948, 952, 953, 340/956; 73/178 T; 342/33, 52; 364/427, 428; 244/114 R; 358/103

[56] References Cited

U.S. PATENT DOCUMENTS

| | | | |
|---|---|---|---|
| 2,667,000 | 1/1954 | O'Connor | 40/217 |
| 2,975,284 | 3/1961 | Osborne | 340/948 |
| 3,510,834 | 5/1970 | Durand | 340/956 |
| 3,671,963 | 6/1972 | Assouline et al. | 340/948 |
| 3,875,551 | 4/1975 | Young | 342/33 |
| 3,999,007 | 12/1976 | Crane | 358/103 |
| 4,104,634 | 8/1978 | Gillard et al. | 342/33 |
| 4,210,930 | 7/1980 | Henry | 358/103 |
| 4,385,354 | 5/1983 | Hornfeld et al. | 340/952 |
| 4,603,973 | 8/1986 | Crow | 356/5 |
| 4,658,431 | 4/1987 | Yokota | 358/103 |

Primary Examiner—Joseph A. Orsino
Assistant Examiner—Brent A. Swarthout
Attorney, Agent, or Firm—Townsend and Townsend

[57] ABSTRACT

The landing approach aid for aircraft exhibits, on the one hand, triple mirrors (4,6) on the landing field. On the other hand, the aircraft (1) is provided with a spotlight, a television camera in the vicinity of the spotlight (at 3) and a device for displaying and/or evaluating the recorded television images. (FIG. 1).

22 Claims, 1 Drawing Sheet

LANDING APPROACH AID FOR AIRCRAFT

BACKGROUND OF THE INVENTION

The invention relates to a landing approach aid for aircraft.

In the case of bad visibility and at night time, it is known to illuminate the runways for aircraft or landing fields for helicopters and to arrange lamps on the landing strip, next to the landing strip and in front of and behind the landing strip. These navigation lights for the runways are very expensive since all lamps must be connected to one electric power source. This is of disadvantage, for example, if a landing strip or landing field is to be temporarily set-up very rapidly because of rescue and emergency cases or for military reasons. In such cases, it is not only of disadvantage that a large number of cables must be laid but, as well, a possibly very heavy electrical generator must be procured if the intended landing field does not happen to be located in the vicinity of an easily accessible power source.

A further disadvantage consists in the fact that, when the navigation lights are switched on, it is not only the pilot who happens to be landing who can recognize the runway or its location but also aircraft located within a wide surrounding circle perceive the location of the runway which can be of disadvantage in the case of military applications.

Analogously to the so-called airfield landing lights described, the so-called landing approach radio beacons must be mentioned which are used for so-called instrument approach, IFR = Instrument Flight Route.

Special comparable facilities are known for military applications. System designations are "Tacan Section Tacan", Takt, Landing radar and so forth. These methods and systems also require complex and costly special equipment.

SUMMARY OF THE INVENTION

It is the object of the invention to create a landing approach aid for aircraft which is of simpler construction and can be simply and rapidly installed.

The solution according to the invention consists in the fact that the landing field exhibits triple mirrors and the aircraft is provided with a spotlight, a television camera in the vicinity of the spotlight and a device for displaying and/or evaluating the recorded television pictures.

Instead of elaborate navigation lights with cable links, the landing field is thus only provided with triple mirrors which exhibit three reflecting areas which are perpendicular to one another and which very accurately reflect an incident light beam back to the light source after having been reflected three times. In this arrangement, the accuracy of the reflection depends on the quality of the triple mirrors. For example, accuracies of better than 5 angular seconds are typical in this case. These triple mirrors can be simply installed even on a temporary landing field by being attached, for example, to a rod which can be stuck into the ground at suitable locations.

The aircraft exhibits a spotlight; the landing spotlight, which in most cases exists in any case, could be used as such spotlights. In addition, a television camera in the vicinity of the spotlight is provided into which the light reflected by the triple mirrors enters. This arrangement is particularly sensitive since the television camera is located in the vicinity of the spotlights. However, triple mirrors of lesser quality could be used which reflect the light within a wider angular range so that the pilot could also detect the reflected light directly from the cockpit. However, in this case the reflected light intensity would be much less so that the landing approach aid is less effective or higher light powers from the spotlight become necessary.

The images recorded with the television camera are then fed to a device for displaying and/or evaluating the recorded television images. The landing can then be carried out on the basis of the light beams reflected by the triple mirrors which specify the location of the triple mirrors on the television image.

If the objective of the television camera is coaxially arranged with respect to the axis of the spotlight, a particularly large amount of light is reflected back into the television camera from the triple mirrors. It has been found to be particularly advantageous if the television camera is a matrix-type CCD camera.

The spotlight does not need to radiate in the visible light range but can also be constructed as an infra-red spotlight. This has the advantage that, in military operations, the enemy cannot directly see the light of the spotlight and thus does not easily notice the landing aircraft. Naturally, in this case the television camera must be arranged in such a manner that it is capable of recording infra-red images.

Suitably, several triple mirrors are arranged on the center line of the runway or in the extension of the latter. Additionally, further triple mirrors can be arranged on the side of the runway so that center line and side limit of the runway can easily be determined.

If the device for displaying and/or evaluating the recorded television images exhibits a monitor, the pilot, when viewing the monitor image, can perform a landing in the same manner as he would perform one with conventional runway lighting.

If the device for displaying and/or evaluating the recorded television images exhibits image converter arrangements for night vision, the landing can be additionally facilitated since, at night, the pilot then sees not only the light spots of the triple mirrors on the monitor but can also detect details of the terrain.

Naturally, the arrangement of the triple mirrors on the landing field will also depend on the type of aircraft which intends to land. If the landing field is to be used for helicopters, the triple mirrors will be differently arranged, for example in the form of a cross, in the center of which the landing field for the helicopter is located.

It is particularly suitable if the device for displaying and/or evaluating the recorded television images exhibits devices for automatically evaluating the reflection images of the triple mirrors. In this case, a further landing aid is given or automatic landing is possible.

After automatic evaluation, conventional instruments such as so-called cross-pointer instruments can be connected for the display in the aircraft. In addition, devices existing in many cases in an aircraft can be mentioned as suitable display means for the aircraft pilot which already have cathode ray tubes which can be connected as a television monitor, such as, for example, the so-called "head-up" displays.

The corresponding landing approach aids hitherto known are based on radio beam methods and, after electronic evaluation, provide the pilot with azimuth and descent angle and range. This enables the pilot to check continuously during his landing approach whether his instantaneous flight path deviates from the ideal landing approach path or not. However, the corresponding radio beam methods require quite accurate positioning and adjusting of the corresponding radio beacons; in addition, there is still the problem of power supply and the necessary cable laying. The corresponding evaluation units in the aircraft are also very expensive.

All these problems can now be circumvented if only the reflection image is evaluated which has been recorded with the television camera. In this arrangement, the triple mirrors can be arranged in such a manner that on the basis of this automatic evaluation, similar landing approach aids can be provided on dials and instruments as is the case with the known radio beam methods. By this means, similarly good or even better results can be achieved as can also be achieved by means of methods for military tactical applications which operate with scanning guide beams in the radar frequency range and use approximately 3 to 38 GHz as a frequency. In these military methods, too, in contrast to the arrangement according to the invention, there is the disadvantage that the ground stations are of highly complicated construction and are immobile whereas, on the other hand, complicated installations are necessary on board the aircraft.

As has been said, all these problems are avoided by the invention. A simple landing approach aid is created which can also be used with small airports and private airfields, small temporary military tactical airfields or helicopter landing fields set-up for emergency cases or catastrophe cases.

The triple mirrors suitably have an aperture angle of approximately 60° so that the pilot of the aircraft which is not yet on the ideal approach line is also capable of detecting the triple mirrors.

If at least one triple mirror arrangement reflecting light coming from all directions is additionally provided on the landing field, the pilot, when he is close to the landing field, can find out exactly where the landing field is located by switching on the spotlight. This additional triple mirror arrangement is suitably arranged to be raised so that the location of the landing field can also be determined from a lowflying aircraft.

Suitably at least two further triple mirrors or triple mirror arrangements are arranged at a predetermined distance from one another. Once the pilot sees the two corresponding triple mirror images, he can determine from the distance of the triple mirrors on the television image or the divergence of the two reflected beams the distance between himself and the airfield. This distance measuring can also occur automatically if the corresponding television image is automatically evaluated. The distance information absolutely necessary for landing is obtained in this manner.

In this arrangement, these further triple mirrors or triple mirror arrangements are suitably arranged to be raised and above one another. So that the distance can be determined not only from the landing approach direction but also from other directions, it is suitably provided that the further triple mirror arrangements are constructed in such a manner that they reflect light coming from all directions.

So that the landing field can also be found or located over relatively long distances in darkness, it is suitably provided that it is additionally equipped with a flashing light beacon or several such flashing light beacons. In this arrangement, the flashing light beacons can be constructed in such a manner that they radiate invisible light, particularly infra-red light so that they cannot be easily seen by military enemies.

In the text which follows, the invention is described by way of example with the aid of an advantageous embodiment, referring to the attached drawings, in which:

DETAILED DESCRIPTION OF PREFERRED EMBODIMENT

Figure 1:
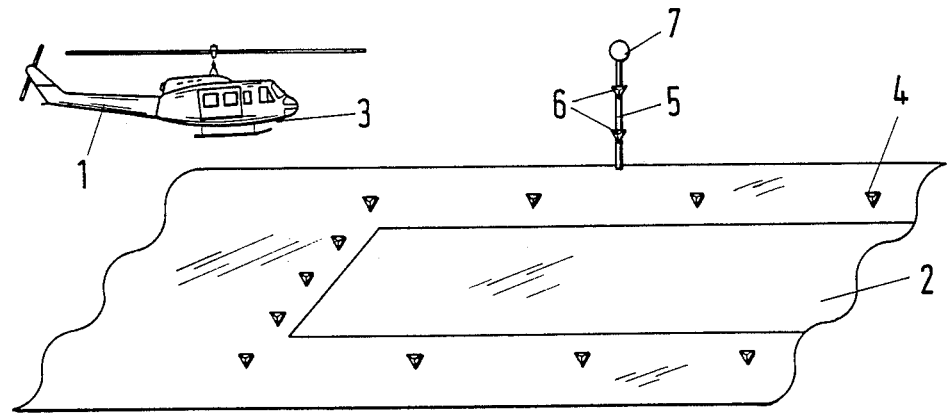
FIG. 1 shows a perspective view of a diagrammatic representation of the landing approach aid according to the invention.

In FIG. 1, an aircraft (1) is shown which wants to land on a runway (2). The aircraft exhibits a device (3) which will be explained in greater detail in conjunction with FIG. 2. The runway (2) is provided at its start and on its sides with triple mirrors (4) which indicate the limit of the runway. Other triple mirrors can also be provided at the center of the runway or in its extension. In this arrangement, the pilot of the aircraft (1) can obtain, with the aid of the corresponding device (3) and other devices, an image which corresponds to that of a normally lit runway which enables him to perform the landing.

In addition to the triple mirrors (4) which can be attached to corresponding rods and stuck into the ground, two further triple mirror arrangements (6) are arranged above one another at a predetermined distance on a mast (5) which reflect light from all directions. A pilot and/or the automatic evaluating device can determine the distance from the landing field or from the runway by evaluating the image of the reflected beams coming from the two triple mirrors (6). At the top of the mast (5), a flashing-light beacon (7) is also located which radiates, for example infra-red light which makes it possible to recognize the location of the landing field even from relatively long distances.

Figure 2:
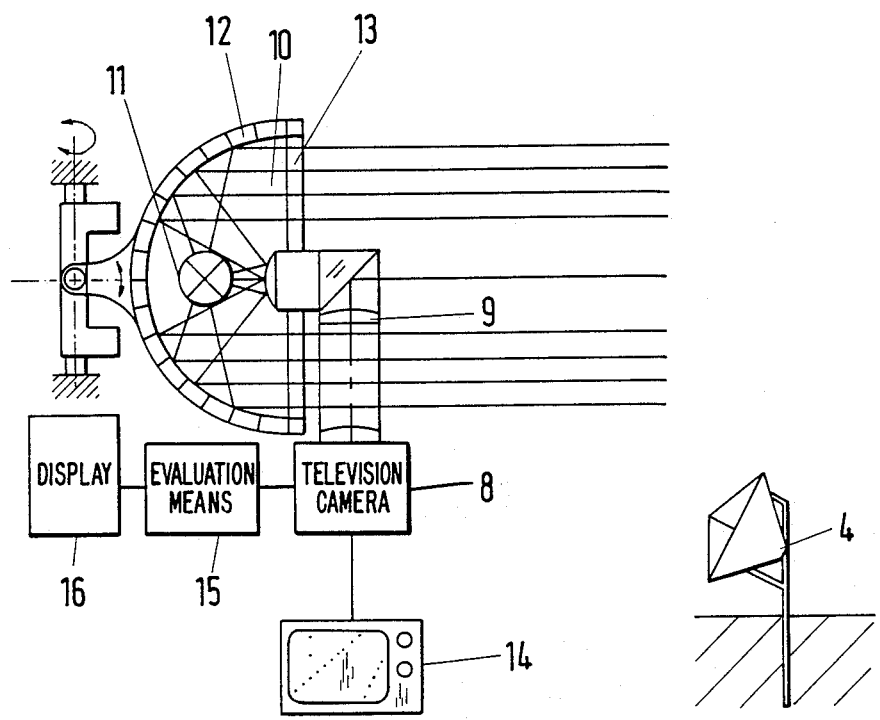
FIG. 2 shows a diagrammatic representation of the essential elements of the latter.

As shown in FIG. 2, the arrangement (3) consists of a television camera (8) with an objective (9) which is arranged in the center axis of a spotlight (10). For this purpose, the spotlight is arranged rotationally symmetrically around the objective (9) and exhibits an annular light source (11), an essentially parabolic reflector (12) and a front covering glass pane (13).

To improve its range, the spotlight can also be or additionally contain a directional flash lamp. Flash lamp sources are operated with high-energy electric pulses and the range of the device benefits from the resultant high luminous density. The pulse frequency must be synchronized with the camera rate.

The light emitted by the spotlight (10) is reflected by one or more retroreflectors (4) and recorded by the television camera (8) with the objective (9). The image of the light spots can then be displayed, for example on a monitor (14) which is connected to the television camera (8). In this arrangement, the television camera (8) can also contain image converters so that the monitor (14) shows not only the image of the light spots from the triple mirrors but also details of the landing field which cannot be recognized with the naked eye.

The television camera (8) is also connected to an evaluating circuit (15) by means of which the location of the light spots is evaluated. If the triple mirrors (4 and 6) are installed with appropriate standardization, similar landing aids can be provided for approaching aircraft as is the case with the conventional radio beam methods. The pilot can then be informed on displays (16) whether he is too high or too low, too far to the right or too far to the left or exactly on the correct landing approach path.

I claim:

1. An approach aid for an aircraft approaching a landing field, comprising:
   at least two triple mirrors situated on the landing field;
   a spotlight, located on the aircraft;
   a television camera, located proximate said spotlight, for generating signals;
   said television camera including an objective, said objective being coaxially situated with respect to an axis of said spotlight; and
   means for displaying signals from said television camera, said means located in said aircraft;
   whereby light from said spotlight reflects off at least one said triple mirror, when said aircraft is approaching said field, and is detected by said television camera and displayed on said means.

2. An approach aid according to claim 1, further including means for evaluating said signals from said television camera.

3. An approach aid according to claim 1, wherein said television camera is a matrix CCD camera.

4. An approach aid according to claim 1, wherein said spotlight is an infra-red spotlight.

5. An approach aid according to claim 1, wherein said television camera operates in a wavelength of said spotlight.

6. An approach aid according to claim 1, wherein said spotlight operates in a pulse mode.

7. An approach aid according to claim 1, including a plurality of said triple mirrors, arranged on a center line of a runway on said landing field.

8. An approach aid according to claim 1, including a plurality of said triple mirrors, arranged on an extension of a runway on said landing field.

9. An approach aid according to claim 1, wherein said means for displaying includes a monitor.

10. An approach aid according to claim 1, wherein said means for displaying includes an image converter for night vision.

11. An approach aid according to claim 1, wherein said means for displaying includes means for automatically evaluating reflected images from said triple mirrors.

12. An approach aid according to claim 1, wherein said triple mirrors have an aperture angle of approximately 60 degrees.

13. An approach aid according to claim 1, further including at least one arrangement of triple mirrors, located on said landing field, for reflecting incoming light from all directions.

14. An approach aid according to claim 13, wherein each said arrangement is elevatable.

15. An approach aid according to claim 1, including at least two additional triple mirrors, arranged on said field at a predetermined distance from one another.

16. An approach aid according to claim 15, wherein each said additional triple mirror is elevatable.

17. An approach aid according to claim 1, including at least two arrangements of triple mirrors, arranged on said field at a predetermined distance from one another.

18. An approach aid according to claim 17, wherein each said arrangement is elevatable.

19. An approach aid according to claim 1, including at least two arrangements of triple mirrors, located on said landing field, for reflecting incoming light from all directions.

20. An approach aid according to claim 1, further including a flashing light beacon adjacent said landing field.

21. An approach aid according to claim 20, wherein said flashing light beacon radiates invisible light.

22. An approach aid according to claim 21, wherein said invisible light is infra-red.

* * * * *